(12) United States Patent
El Kolli et al.

(10) Patent No.: US 7,751,439 B2
(45) Date of Patent: Jul. 6, 2010

(54) METHOD OF ALLOCATION OF RESOURCES FOR TRANSMISSION OF A DATA CONTENT, CORRESPONDING COMPUTER PROGRAM PRODUCT, STORAGE MEANS AND DEVICE

(75) Inventors: Yacine El Kolli, Rennes (FR); Arnaud Closset, Cesson-Sevigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 107 days.

(21) Appl. No.: 12/036,645

(22) Filed: Feb. 25, 2008

(65) Prior Publication Data

US 2008/0205442 A1 Aug. 28, 2008

(30) Foreign Application Priority Data

Feb. 26, 2007 (FR) .................................. 07 01361

(51) Int. Cl.
*H04J 3/16* (2006.01)
(52) U.S. Cl. .................................. 370/468; 370/395.65
(58) Field of Classification Search ................. 370/468, 370/395.65, 310.1
See application file for complete search history.

(56) References Cited

U.S. PATENT DOCUMENTS

| | | | | |
|---|---|---|---|---|
| 6,052,384 | A * | 4/2000 | Huang et al. ................. | 370/468 |
| 7,012,902 | B2 * | 3/2006 | Omi et al. ................. | 370/310.1 |
| 7,075,937 | B1 * | 7/2006 | El Kolli ................. | 370/395.65 |
| 7,099,322 | B1 | 8/2006 | Frouin et al. ................. | 370/390 |
| 2001/0038640 | A1 | 11/2001 | McKinnon, III et al. .... | 370/468 |
| 2002/0176367 | A1 | 11/2002 | Gross ......................... | 370/252 |
| 2005/0163156 | A1 | 7/2005 | Takeda et al. ............... | 370/468 |
| 2006/0253618 | A1 | 11/2006 | Frouin et al. ................... | 710/8 |

FOREIGN PATENT DOCUMENTS

EP 1 154 354 A2 11/2001

OTHER PUBLICATIONS

Fairman, B., "Payload Format for 1394/61883 Isochronous Streams," Internet Engineering Task Force A/V Transport Working Group, Jun. 2003.
Feng, F. et al., "End-to-end Stream Establishment in Consumer Home Networks," IEEE CCNC 2006 Proceedings, pp. 888-891.

* cited by examiner

*Primary Examiner*—Albert T Chou
(74) *Attorney, Agent, or Firm*—Fitzpatrick, Cella, Harper & Scinto

(57) ABSTRACT

A method for the allocation of resources for the transmission, in a communications network, of a data stream from an intermediate device to a sink device, said data stream comprising a plurality of data applications packets and being transmitted from a source device to the intermediate device in the form of data transport packets according to a communications protocol.

The intermediate device performs the following steps:
  reception of data transport packets according to the communications protocol;
  obtaining application time-stamp information included in the data of the data stream contained in the data transport packets received;
  determining a bit rate, called an application bit rate, from said application time-stamp information obtained and a piece of information on quantity of data of the data stream received by the intermediate device;
  determining a value of bandwidth to be allocated as a function of the application bit rate to transmit the data stream from the intermediate device to the sink device;
  allocation of the value of bandwidth to be allocated to the transmission of the data stream from the intermediate device to the sink device.

19 Claims, 11 Drawing Sheets

METHOD OF ALLOCATION OF RESOURCES FOR TRANSMISSION OF A DATA CONTENT, CORRESPONDING COMPUTER PROGRAM PRODUCT, STORAGE MEANS AND DEVICE

1. FIELD OF THE INVENTION

The field of the invention is that of the transmission of data contents on a communications network.

More specifically, the invention relates to the management of the reservation of resources during the transmission of at least one stream in a communications network.

2. PRIOR ART SOLUTIONS

Home networks are increasingly being made in the form of IP LAN (Internet Protocol Local Area Network) compliant networks using intermediate layer control software or "control middleware" as defined in the UPnP (Universal Plug and Play) standard or in the DLNA (Digital Living Network Alliance) Grouping.

One goal of home networks is to enable the distribution of audio-video contents to the home and provide access to different source terminals from different read terminals available in the home.

For example, it must be possible to access one and the same DVD player, connected to the home network, from a television set situated in the entertainment room or from another television set situated in a bedroom or again from another television set situated in the kitchen.

Manufacturers of audio-video electronic devices are beginning to integrate LAN interfaces into their devices. However, many audio-video devices are still equipped with interfaces compliant with the IEEE-1394 standard (as described in the documents "IEEE Std. 1394-1995, Standard for High Performance Serial Bus" and "IEEE Std 1394a-2000, Standard for High Performance Serial Bus Supplement") for the sending/reception of audio-video contents.

Since the IEEE-1394 interface is the preferred interface for the sending/reception of audio-video contents, standardization efforts are being implemented in order to make bridge node devices (or interconnection nodes), between IEEE-1394 and LAN devices.

One of these attempts at standardization is being made by the CEA R7 working group on "EA-2005 AV Adapter to Connect Ethernet and 1394 Devices" and is described in detail at the following address http://www.ce.org/Standards/2502.asp#2538.

Quality of service designated here below as QoS is a major problem to be resolved when the focus of interest is the interfacing between a source device compliant with the IEEE-1394 protocol and a network compliant with the IP LAN protocol. The IEEE-1394 bus naturally implements QoS because it implements resource reservation (in terms of transmission channel and bandwidth). When a transmission channel and a bandwidth are allocated to a node, the system guarantees these resources to the node.

A traditional IP LAN does not naturally implement QoS. The UPnP protocol defines high-level QoS, the RSVP protocol (as defined in the IETF RFC 2205 standard) enables IP level resource reservation while IEEE 802.1 AVB compliant protocol (as defined in detail at: http://www.ieee802.org/1/pages/avbridges.html) is dedicated to layer 2 QoS.

The document <<End to End Stream Establishment in Consumer Home Networks" published in IEEE CCNC 2006 Proceedings describes the way in which the UPnP, RSVP and IEEE 802.1 AVB can be combined. It is therefore possible to imagine a correspondence (or mapping) between IEEE-1394 QoS and IP LAN QoS.

Traditionally, in the context of resource reservation for a content to be transmitted by an IEEE-1394 source device to an IP-LAN sink device through an IEEE1394/IP LAN bridge node or interconnection node (the source device being connected to the interconnection node via an IEEE-1394 bus), the same bit rate is reserved for this content on the IP-LAN as the one reserved on the IEEE-1394 bus.

Thus, resource reservation on an IEEE-1394 bus for a content transmitted by an IEEE-1394 source device is based solely on the capacities (in terms of bit rate) of the source device and does not depend on the characteristics of the content. If we take the example of an audio-video hard disk drive (AV HDD), according to the IEEE 1394 and IEC 61883 standards, this HDD exports a quantity of bandwidth to be reserved for the transmission of any one of its contents equal to the maximum bit rate that the AV HDD can take in transmission.

Thus, if the transmission of content in the IP-LAN does not require a bit rate as high as the maximum bit rate that can be given by the source device, there will be excess reservation of resources for this transmission of content on the IP-LAN with regard to what is necessary.

Now, the bandwidth of an IEEE-1394 bus generally varies from S100 (100 Mbit/s) to S800 (800 Mbit/s). The bandwidth used in an IP LAN (when based on the Ethernet protocol) generally varies from 10 Mbit/s to 1 Gbit/s. The bandwidth most commonly used is 100 Mbit/s, especially for home applications. In the case of an IP LAN of the IP WLAN (wireless local area network) type, the bandwidth used generally varies from 12 to 120 Mbit/s.

Thus, because of the associated above-mentioned phenomenon of over-reservation and because the total bandwidth (for all the contents to be transmitted simultaneously on the network) of the IP-LAN is limited, an under-utilization of the IP LAN is observed in the transmission of data streams with pre-reserved bandwidth and, in any case, the number of such contents or data streams that may travel in transit through the IP-LAN is limited.

3. GOALS OF THE INVENTION

The invention, in at least one embodiment, is aimed especially at overcoming the drawbacks of the prior art.

More specifically, it is a goal of the invention, in at least one of its embodiments, to provide a technique for the transmission of a stream on a transmission path between a source device and a sink device in a communications network which, depending on at least one characteristic of the stream, optimizes resource reservation for the transmission of the stream between an intermediate device of the transmission path and the sink device.

Another goal of the invention, in at least one of its embodiments, is to implement a technique of this kind to prevent the occurrence of over-reservation in the transmission of contents in the communications network.

Another goal of the invention, in at least one of its embodiments, is to implement a technique of this kind that can be used to transmit more streams simultaneously in the network.

It is another goal of the invention, in at least one of its embodiments, to implement a technique of this kind that is compatible with the recommendations of the protocols implemented.

The invention, in at least one of its embodiments, is also aimed at implementing a technique of this kind that is simple to implement and costs little.

4. SUMMARY OF THE INVENTION

In a particular embodiment of the invention, a method is proposed for the allocation of resources for the transmission, in a communications network, of a data stream from an intermediate device to a sink device, said data stream comprising a plurality of data applications packets and being transmitted from a source device to the intermediate device in the form of data transport packets according to a communications protocol.

According to the invention, the intermediate device performs the following steps:
- reception of data transport packets according to the communications protocol;
- obtaining application time stamp information included in the data of the data stream contained in the data transport packets received;
- determining a bit rate, called an application bit rate, from said application time stamp information obtained and a piece of information on quantity of data of the data stream received by the intermediate device;
- determining a value of bandwidth to be allocated as a function of said application bit rate to transmit said data stream from the intermediate device to the sink device;
- allocation of said value of bandwidth to be allocated to the transmission of the data stream from the intermediate device to the sink device.

The general principle of the invention consists in determining, from the application time stamp information included in the stream, the minimum bandwidth required for the transmission of the stream between the intermediate device and the sink device and the reservation of this minimum bandwidth for this transmission.

The fact of using such application time stamp information in order to determine the bandwidth to be allocated removes the errors introduced by the effects of the data encapsulation according to the IEEE 1394 standard in the context of bandwidth computation.

Indeed, according to the IEC 61883 standard, the TS (Transport Stream) type packets are data applications packets and are encapsulated in IEEE 1394 type isochronous packets (which are data transport packets), the application time stamp information being present in the header of the TS type packets. One or more TS type packets may be encapsulated in an IEEE 1394 type isochronous packet. For each reserved transmission channel on an IEEE 1394 type bus, an isochronous packet is sent once every (125-microsecond) cycle.

However, the frequency of the audio/video encoder enabling the generation of the TS type packets is independent of and most often different from the frequency of the IEEE 1394 bus. It is then not possible to make sure that a same number of pieces of data contained in TS type packets will be available at each 125-microsecond cycle pacing the IEEE 1394 bus. Even if the IEC 61883 standard can be used to define the partial TS (partial transport stream) packets, the rules of encapsulation of the TS type packet data defined in part 4 of this standard (IEC 61883-4) do not enable a same number of TS type data packets to be provided at each cycle. The size of the IEEE 1394 type isochronous packets is therefore not constant from one cycle to another, even if the data stream generated by the audio/video encoder is at a constant (application) bit rate. The encapsulation of the data according to the IEEE 1394 standard and the computation of the bandwidth on the basis of the isochronous packets can then lead to interpreting a constant application bit rate (also called a CBR or constant bit rate stream) as a variable application bit rate stream or VBR (variable bit rate) stream.

Thus, through the use of time-stamp information, it is possible to determine the real application bit rate independently of any mode of transport related to the encapsulation of the data according to the IEEE 1394 and IEC 61883 standards. It will thus be possible to use a mode of transport on the IP LAN based on an encapsulation of the data in an RTP type protocol and manage the reservation of resources, according to the determined application bit rate, for the transport of the encapsulated data according to a traffic shaping mode, and to do this in order to ensure quality of service (QOS), for example in compliance with the IEEE 802.11e standard.

Thus, the method of transmission of the invention enables the optimizing, as a function of at least one characteristic of the stream, of the reservation of resources for the transmission of the stream between an intermediate device of the transmission path and the sink device.

Furthermore, the method of the invention prevents the occurrence of over-reservation for the transmission of content in the communications network.

Furthermore, through the technique of the invention, it is possible to obtain the simultaneous transit of more streams on the network because the available and unused bandwidth in the network can be reduced.

Furthermore, the method of the invention can be based on transmission protocols such as the IEEE-1394 protocol and the TCP/IP protocol.

Advantageously, the step for determining a bandwidth value to be allocated includes a step for determining whether the data stream has a constant bit rate or a variable bit rate.

It is thus possible to apply a bandwidth reservation based on different pieces of information depending on the behavior of the application bit rate (i.e. whether it is constant or variable).

Preferably, with each of said data application packets of the stream comprising a header comprising an application time stamp piece of information, said step for determining the application bit rate comprises a step for determining at least one instantaneous application bit rate value of the data stream from the time difference between the application time stamp information of an application data packet preceding a current application data packet and the application time stamp information of the current application data packet in the data stream.

Thus, the value of the instantaneous bandwidth associated with a current application packet is for example equal to the quantity of information included in the packet preceding the current packet divided by the time difference between the time-stamp information of the packet preceding the current packet and the time-stamp information of the current packet.

According to a preferred characteristic of the invention, said step for determining the application bit rate also comprises a step for comparing at least two instantaneous application bit rate values of the data stream.

It is then possible to determine the behavior of the application bit rate (whether constant or variable): for example, if the values of the instantaneous application bit rate are equal, the application bit rate is considered to be a constant bit rate, if not it is considered to be a variable bit rate.

Advantageously, if the stream is a constant bit rate stream, then the value of bandwidth to be allocated depends on said instantaneous application bit rate value or one of said instantaneous application bit rate values.

Preferably, if the stream is a variable bit rate stream, the method of the invention includes a step for determining the largest-sized data application packet of the data stream, and the value of bandwidth to be allocated is equal to a determined value, said determined value enabling the transmission of a data stream for which each application data packet has the size of the largest-sized application packet of the data stream.

According to a first embodiment of the invention, the method furthermore comprises a step for verifying the continuity of the data stream.

Thus, in the case of the detection of a discontinuity of the stream (for example due to a loss of packets), the method is for example re-initialized.

According to a second embodiment of the invention, said method is implemented periodically.

Preferably, the method of the invention is implemented in the form of monitoring phases that follow on one after the other. It is then possible to detect a change in behavior of the application bit rate of the transported data stream. This is the case of example when the user selects another content sent out by an IEEE 1394 type audio-video hard disk drive different from the content being broadcast.

Thus, if the stream should undergo a modification after a bandwidth has been allocated to it in a given monitoring phase then, as the case may be, the bandwidth to be allocated to the stream may be modified accordingly in the monitoring phase following the modification of the stream.

Advantageously, the method preliminarily comprises the following steps:

reception of a request for allocation of transmission resources for the data stream, said request comprising a piece of information on maximum quantity of resources necessary;

attempt to allocate a bandwidth value for the transmission of the data stream from the intermediate device to the sink device, said bandwidth value depending on the information on maximum quantity of resources necessary;

if the allocation attempt should fail, then setting up a stream connection according to the communications protocol for the transmission of the data stream from the source device to the intermediate device, the intermediate device erasing the received data transport packets once the application time-stamp information has been obtained.

Thus, when there is a failure of an attempt to allocate resources for the transmission of a data stream based on a predetermined piece of information (for example the maximum bit rate capacities of an IEEE 1394 type audio-video hard disk drive) between the intermediate device and the sink device, then a stream connection between the source device and the intermediate device enables the implementation of a phase for monitoring the data stream according to the invention and thus once the application bit rate has been determined, enables a fresh attempt to allocate resources for the transmission of a data stream as a function of the real bit rate of the data stream.

Preferably, prior to the step for obtaining application time-stamp information, the method includes a step for determining a format of the data stream.

Thus, it is possible to apply a bandwidth reservation based on information that differs according to the format of the content of the data stream. For example, should the stream be a DV type stream, then the IEC 61883 standard relating to DVCR (digital video cassette recorder) type streams, more commonly known as DV streams, indicates that the stream has CBR (constant bit rate) behavior. In this case, the bandwidth value to be allocated is in the range of 30 Mbit/s if the stream is of an SD-DVCR ("Standard Definition Digital Video Cassette Recorder") type, more commonly called SD-DV, type. It is in the range of 60 Mbit/s if the stream is of an HD-DVCR ("High Definition Digital Video Cassette Recorder") type, more commonly called HD-DV, type.

Should the stream be of an MPEG2 ("Motion Picture Expert Group 2") type, having a CBR (constant bit rate) or VBR (variable bit rate), then the method of the invention can be used to obtain a bandwidth value to be allocated to the transmission of this stream.

The invention also relates to a computer program product, downloadable from a communications network and/or recorded on a computer-readable support and/or executable by a processor, comprising program code instructions for the implementation of the transmission resource allocation method as described here above.

In another particular embodiment, the invention relates to a computer-readable storage means, which may be totally or partially detachable, storing a set of instructions executable by said computer to implement the method for the allocation of transmission resources as described here above.

The invention also relates to an intermediate device comprising means for the allocation of resources for the transmission of a data stream comprising a plurality of data applications packets in a communications network from the intermediate device to a sink device, the intermediate device comprising means of reception of the stream in the form of data transport packets according to a communications protocol, said stream coming from a source device.

According to the invention, in such a device, the means of allocation of transmission resources comprise:

means of reception of data transport packets according to the communications protocol;

means for obtaining application time stamp information included in the data of the data stream contained in the data transport packets received;

means for determining a bit rate, called an application bit rate, from said application time stamp information obtained and a piece of information on quantity of data of the data stream received by the intermediate device;

means for determining a value of bandwidth to be allocated as a function of said application bit rate to transmit said data stream from the intermediate device to the sink device;

means of allocation of said value of bandwidth to be allocated to the transmission of the data stream from the intermediate device to the sink device.

Preferably, the means for determining a bandwidth value to be allocated includes means for determining whether the data stream has a constant bit rate or a variable bit rate.

Advantageously, with each of said data application packets of the stream comprising a header comprising an application time stamp piece of information, said means for determining the application bit rate comprise means for determining at least one instantaneous application bit rate value of the data stream from the time difference between the application time stamp information of an application data packet preceding a current application data packet and the application time stamp information of the current application data packet in the data stream.

Preferably, the means for determining the application bit rate also comprise means for comparing at least two instantaneous application bit rate values of the data stream.

Advantageously, the means of allocation of transmission resources comprise means to detect whether the stream is a constant bit rate stream, and the means for determining a value of the bandwidth to be allocated take account of said value or of one of said values of instantaneous application bit rate of the stream if the stream is at constant bit rate.

According to a preferred characteristic of the invention, the means of allocation of transmission resources comprise means to detect whether the stream is a variable bit rate stream, and means for determining the largest-sized data application packet of the data stream, said means being activated if the stream is with variable bit rate, and the means for determining a value of bandwidth to be allocated take account of a determined value, said determined value enabling the transmission of a data stream for which each application data packet has the size of the largest-sized application packet of the data stream.

Preferably, the means of allocation of transmission resources furthermore comprise means for verifying the continuity of the data stream.

Advantageously, the means of allocation of transmission resources are activated periodically.

According to an advantageous characteristic of the invention, the means of allocation of transmission resources comprise:
- means of reception of a request for allocation of transmission resources for the data stream, said request comprising a piece of information on maximum quantity of resources necessary;
- means for making an attempt to allocate a bandwidth value for the transmission of the data stream from the intermediate device to the sink device, said bandwidth value depending on the information on maximum quantity of resources necessary;
- means for setting up a stream connection according to the communications protocol for the transmission of the data stream from the source device to the intermediate device, the intermediate device comprising means to erase the received data transport packets, said erasure means being activated by the obtaining of application time-stamp information, said means for setting up a stream connection according to the communications protocol being activated if the allocation attempt should fail.

Preferably, the means of allocation of transmission resources comprise means for determining a format of the data stream.

5. LIST OF FIGURES

Other characteristics and advantages of the invention shall appear more clearly from the following description of several preferred embodiments, given by way of simple illustrative and non-exhaustive examples, and from the appended drawings of which:

Figure 1:
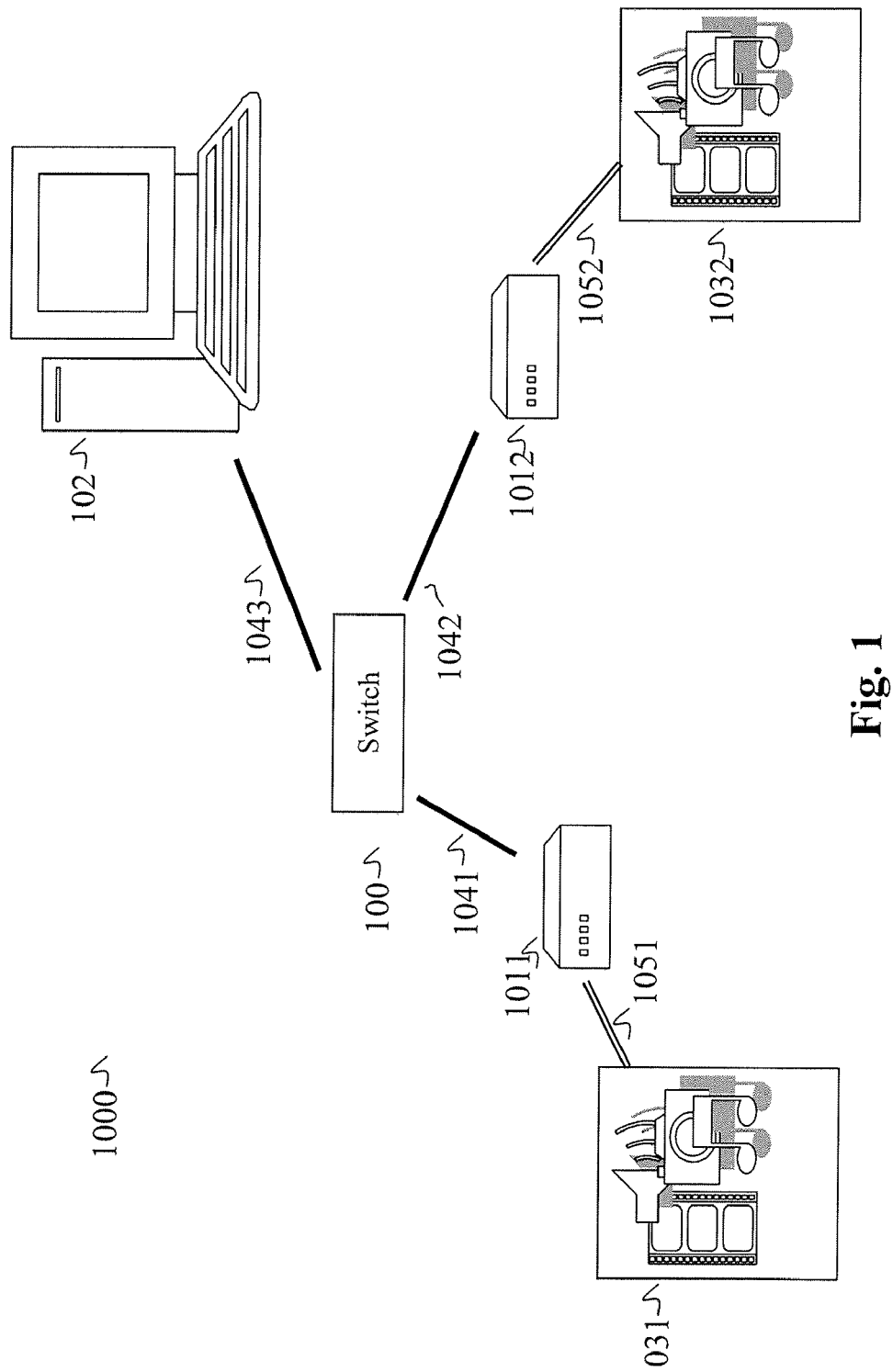
FIG. 1 is a drawing of an IP LAN type local communications network in which the transmission method according to one particular embodiment of the invention can be implemented.
Figure 3:
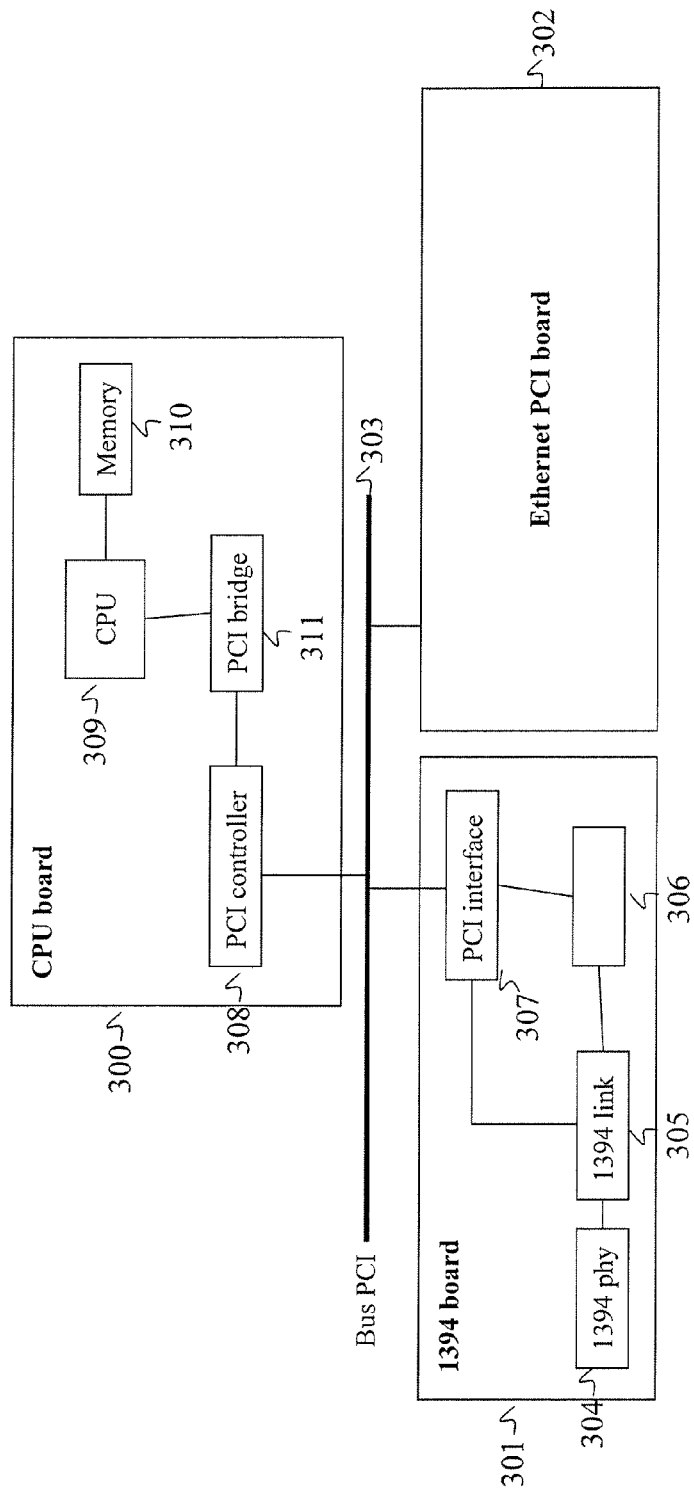
Figure 4:
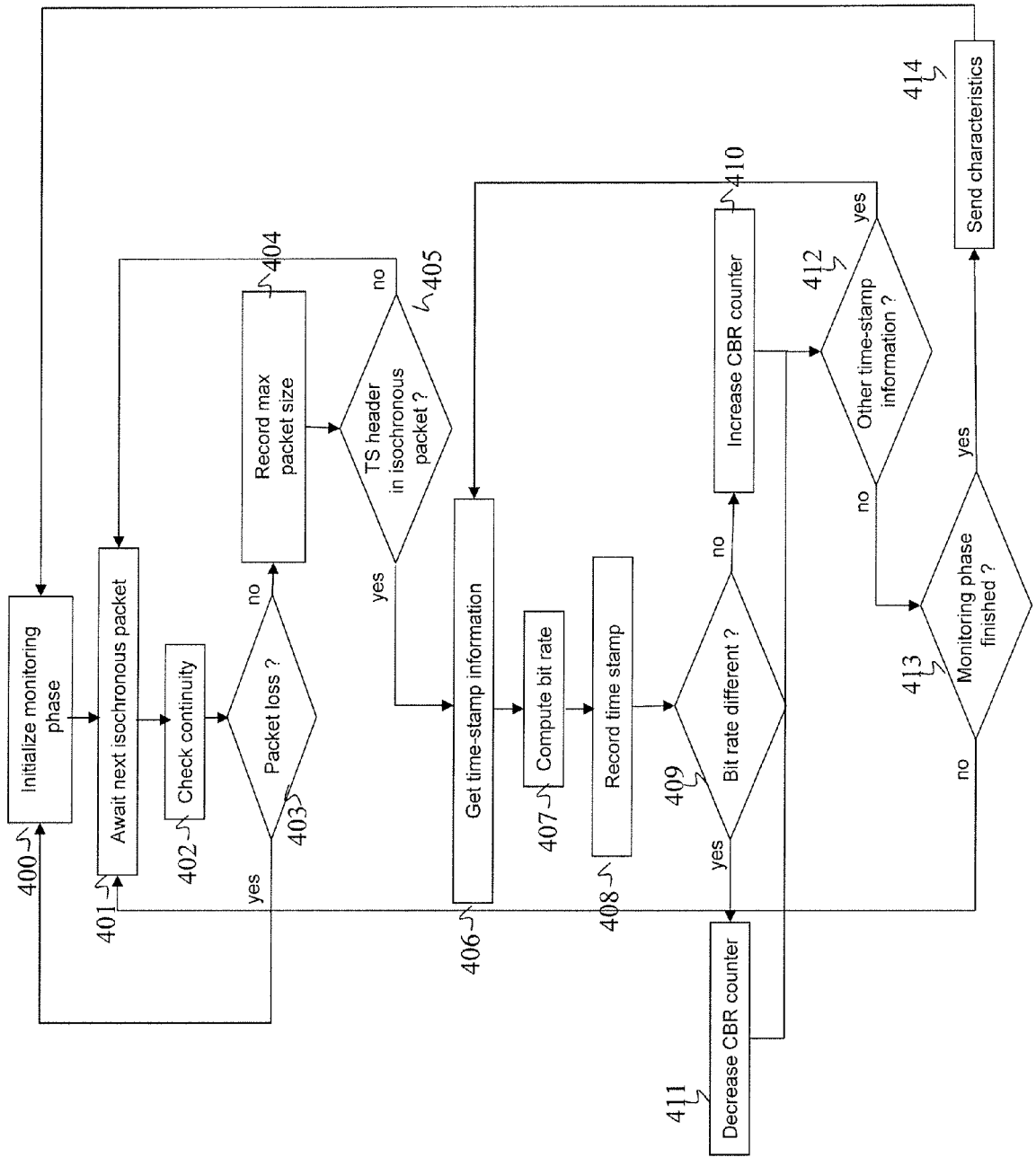
Figure 5:
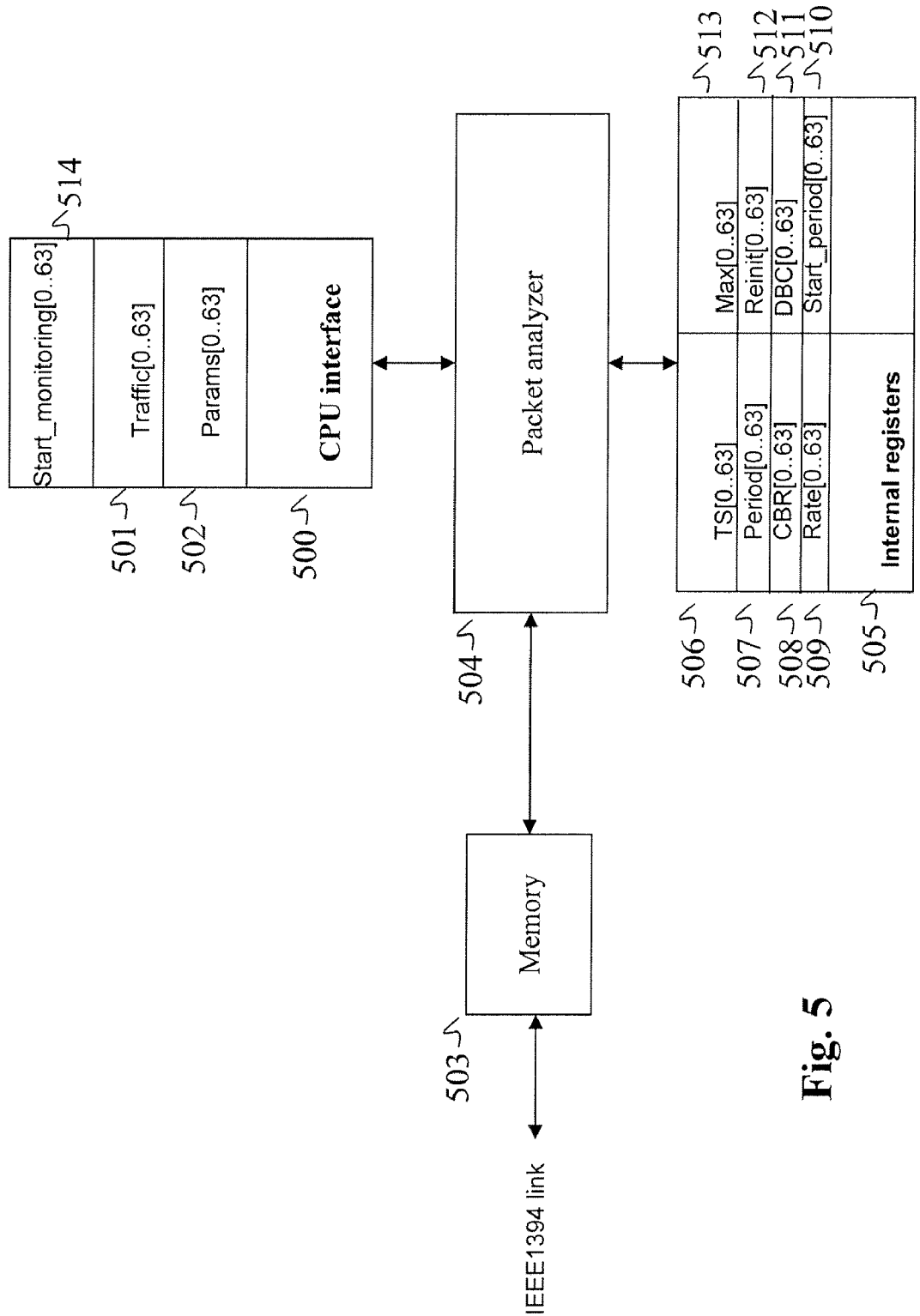
Figure 6:
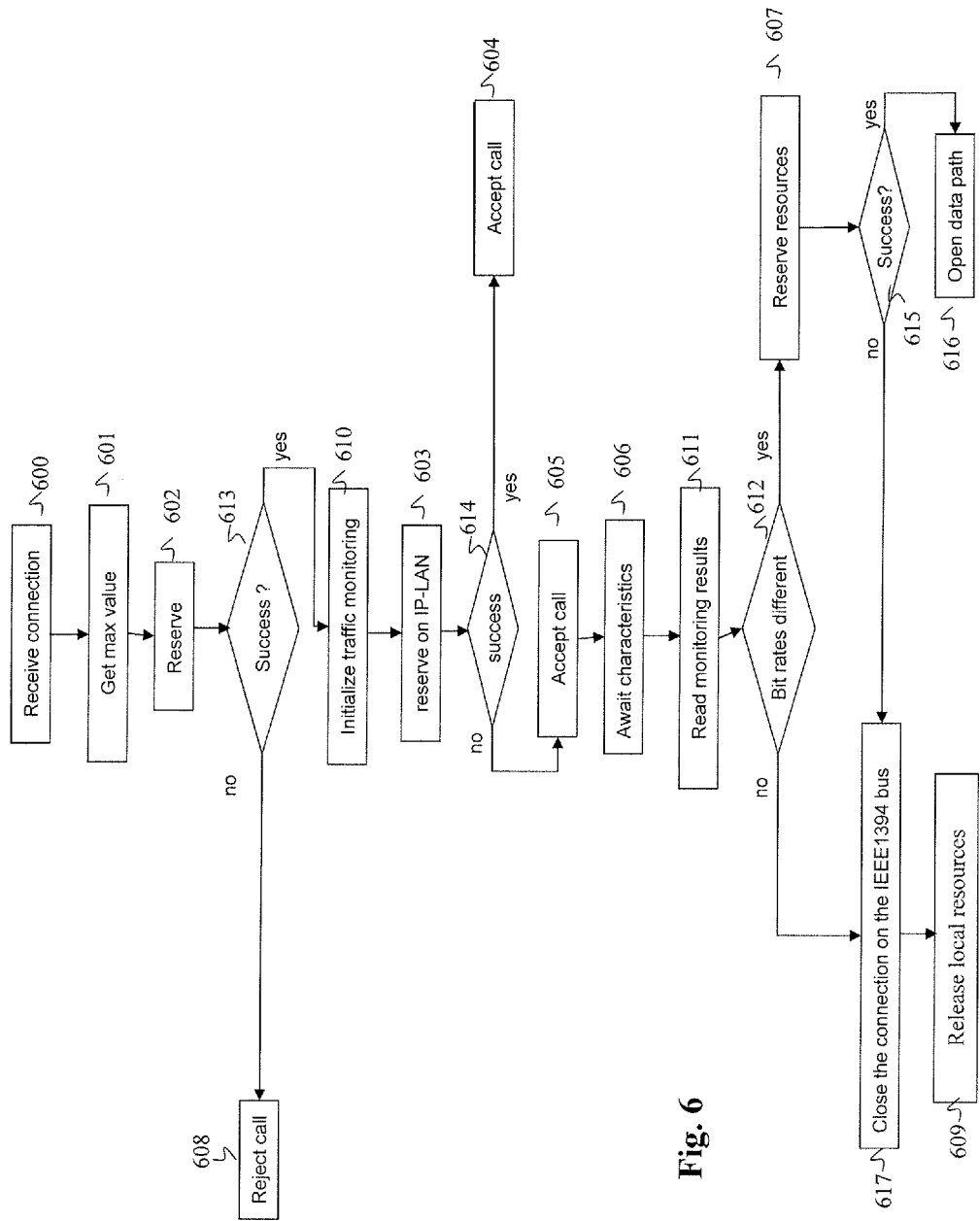
Figure 7:
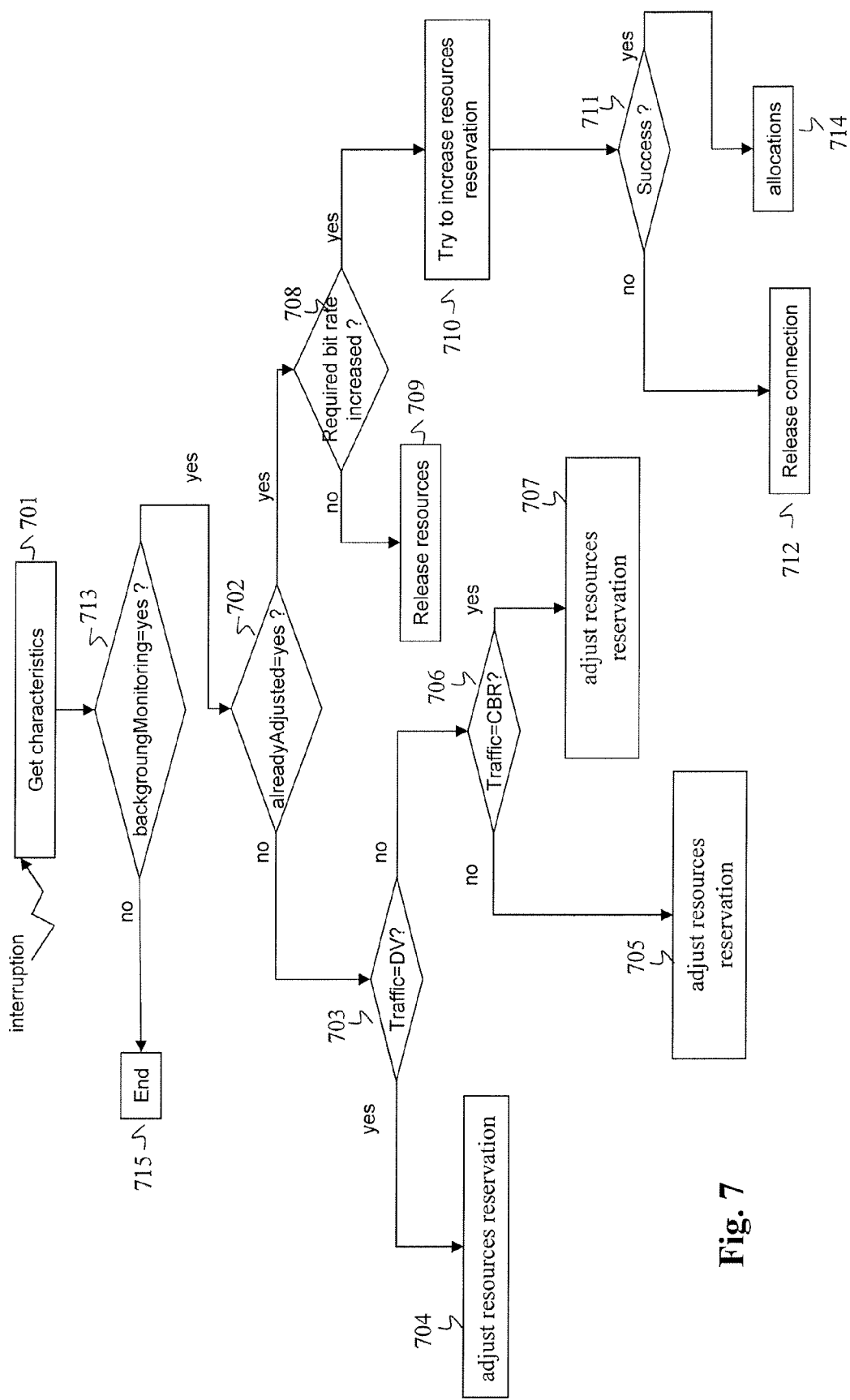
Figure 8A:
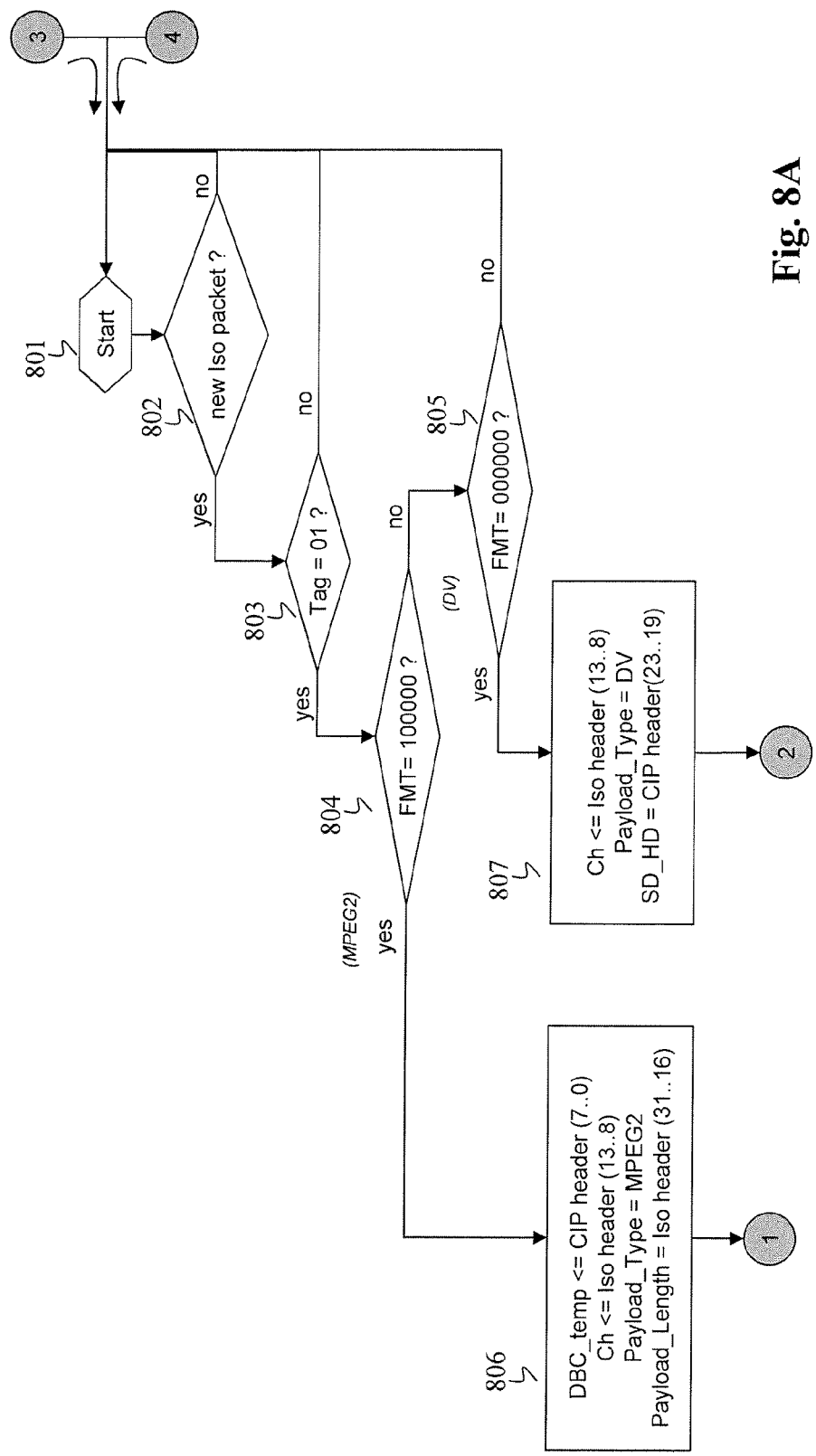
Figure 8B:
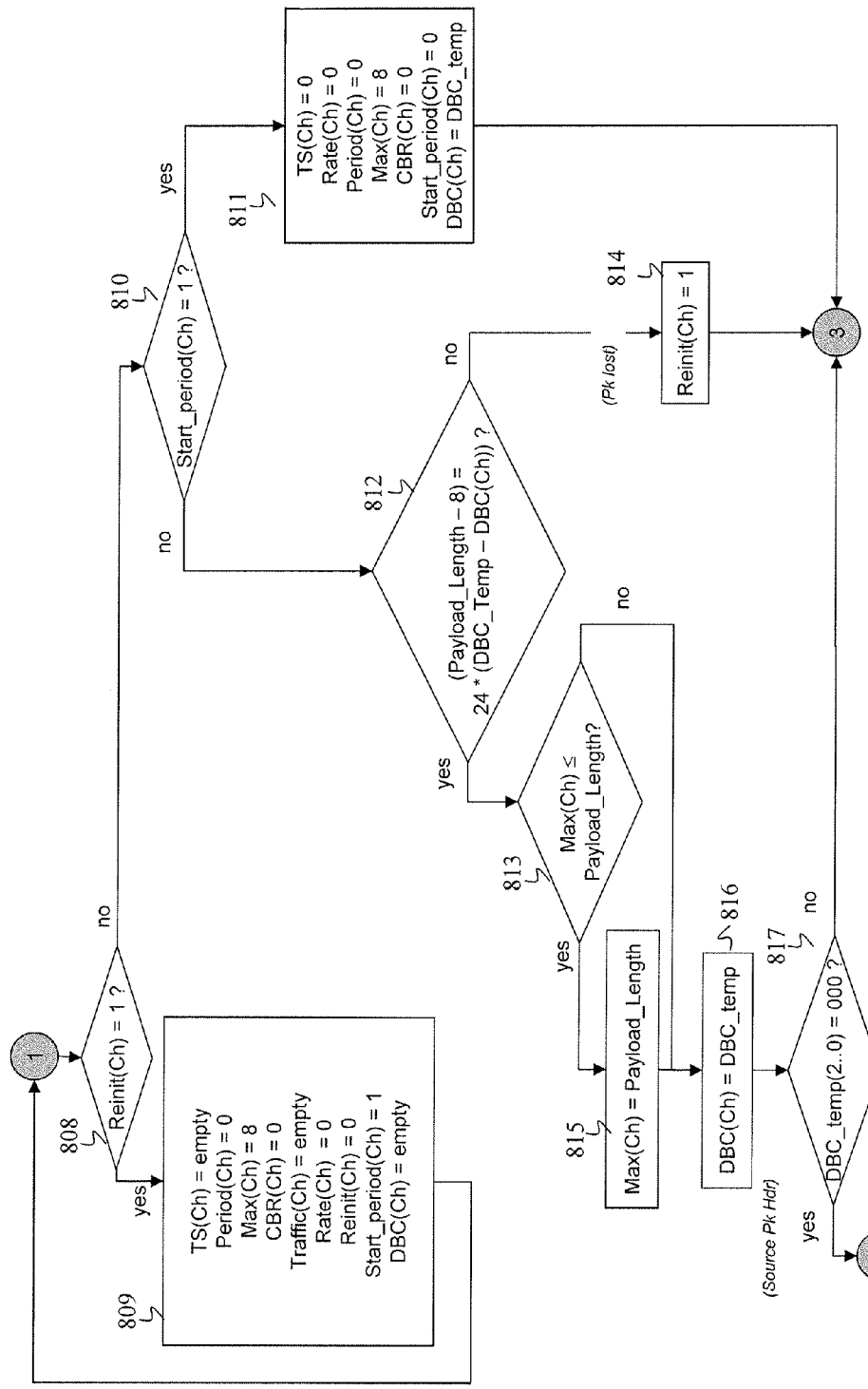
Figure 8C:
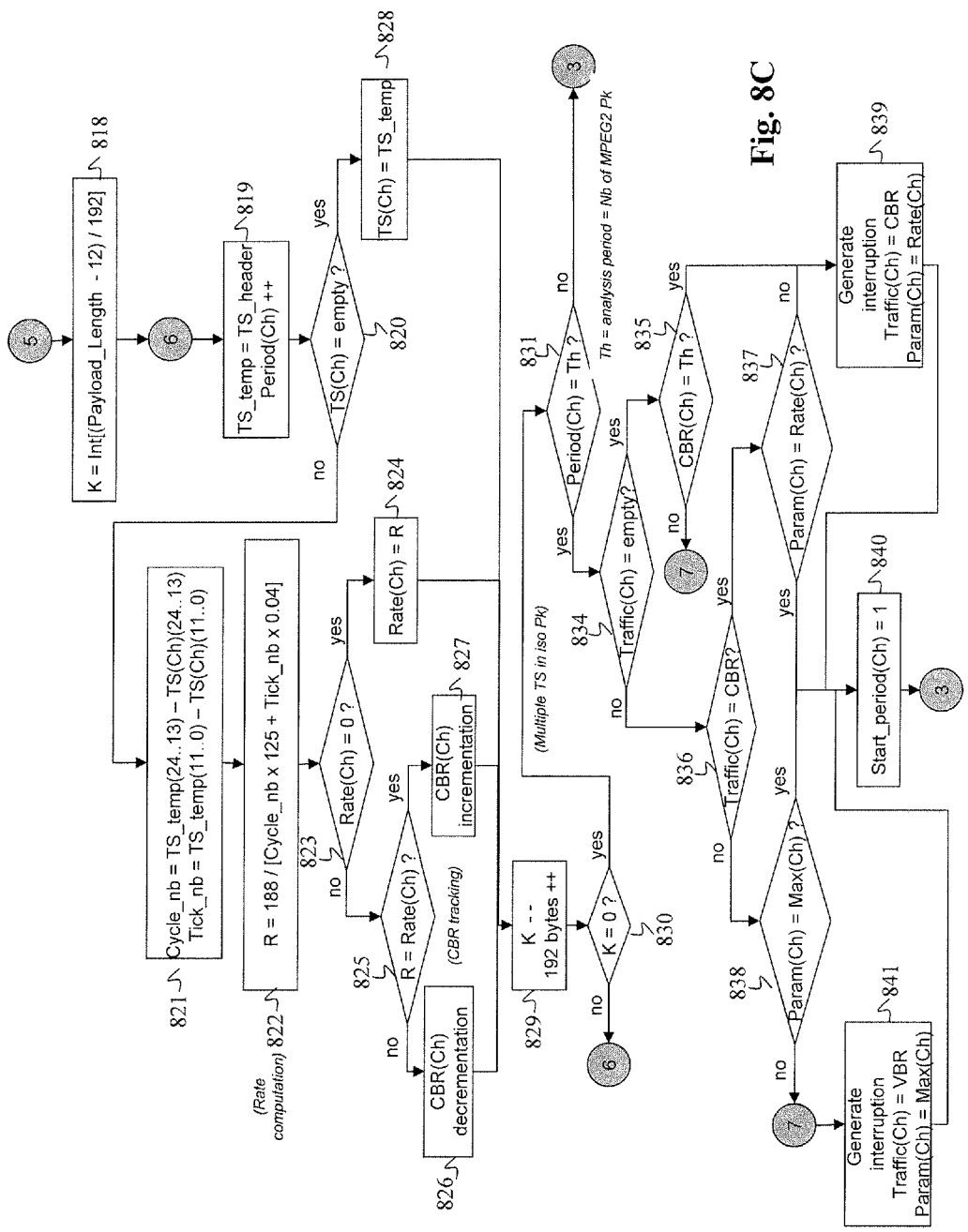
Figure 8D:
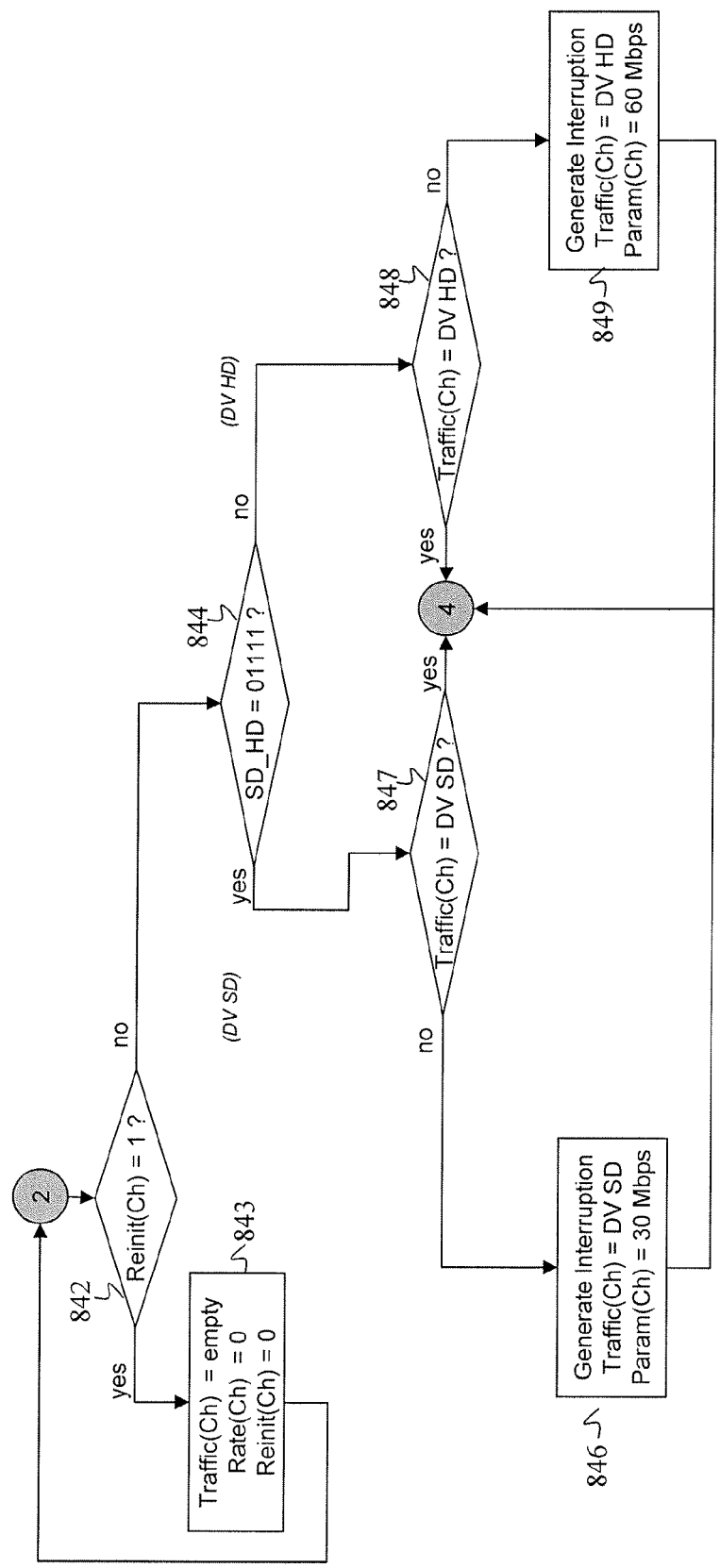

FIG. 3 presents an example of implementation of the first interconnection node of the network of FIG. 1 according to the above-mentioned particular embodiment;

FIG. 4 illustrates the main steps of an monitoring algorithm implemented at the opening of connection for the transmission of a stream between the first IEEE-1394 bus and the first Ethernet segment of the network of FIG. 1 according to the above-mentioned particular embodiment;

FIG. 5 presents an example of implementation of the traffic monitor module according to the above-mentioned particular embodiment;

FIG. 6 presents the main steps of a call admission control algorithm implemented by the call admission manager module in the context of the above-mentioned particular embodiment;

FIG. 7 presents the main steps of an algorithm for monitoring the evolution of bandwidth requirements for the transmission of a content or given active stream coming from an IEEE-1394 bus, in the context of the above-mentioned particular embodiment;

FIGS. 8A to 8D present the main steps of an monitoring algorithm according to the above-mentioned embodiment, for the monitoring on a given channel of a given content or stream, for example the content c0, when the identified format of c0 (FIG. 8A) is MPEG2 TS (FIGS. 8B and 8C) or DV (FIG. 8D).

6. DESCRIPTION OF AN EMBODIMENT OF THE INVENTION

A description is given here below of the transmission method according to a particular embodiment of the invention in the context of the IP LAN type local communications network 1000 of FIG. 1.

The local area network 1000, here below called the IP LAN 1000 is, for example, a home network in which the data contents, especially of a multimedia type, are transmitted in accordance with quality of service (QoS) criteria.

The IP LAN 1000 comprises an Ethernet switch 100 to which the following are connected:
- a first IEEE-1394/IP LAN interconnection node or bridge node 1011 via a first Ethernet segment 1041;
- a second IEEE-1394/IP LAN interconnection node 1012 via a second Ethernet segment 1042; and
- a sink terminal 102, for example a computer, via a third Ethernet segment 1043.

A first source terminal 1031 is connected to the first IEEE-1394/IP LAN interconnection node 1011 via a first IEEE-1394 bus 1051.

A second source terminal 1032 is connected to the second IEEE-1394/IP LAN interconnection node 1012 via a second IEEE-1394 bus 1052.

The Ethernet segments 1041, 1042, 1043 and the switch 100 apply a transmission protocol classically used on a LAN such as the TCP/IP protocol.

Naturally, the network 1000 may implement any communications protocol other than the TCP/IP protocol, for example an IEEE-1355 type protocol, an IEEE-1394 type protocol or even any other protocol. For, the network 1000 may constitute a backbone network to which a set of IEEE-1394 buses are connected by means of interconnection nodes (or bridge nodes) between each of the IEEE-1394 buses and the backbone network. On the backbone network, there then converge a certain number of data streams that have to travel in transit from one IEEE-1394 bus to another. The resources of the backbone network are then limited relative to the resources of the set of IEEE-1394 buses and the invention applied to this context enables the backbone network to carry a larger number of streams.

It will be noted that the IP LAN 1000 may equally well be a home network or a company local area network, for example partially or totally formed by wireless segments (for example compliant with the WiFi® or Bluetooth® standards).

Naturally, the invention can be implemented in any type of wireless or wire-based communications network.

Here below, a description is given of the transmission method according to the above-mentioned particular embodiment of the invention in a particular example of the transmission, in the network 1000, of an audio-video content (stream) c0 (for example of the SD-DV or HD-DV or MPEG2, or other type) from the first source terminal 1031 (source device) to the sink terminal 102 (sink device) through the IEEE 1394/IP LAN interconnection node 1011 (intermediate device). In the context of this transmission, the content c0 is transmitted on the transmission path comprising the source device and the sink device, said transmission path also comprising the intermediate device.

The transmission method of the invention (described here below in greater detail) is implemented in the form of a software program and/or a plurality of software subprograms (comprising a plurality of algorithms described here below) executed in one or more machines of the IP LAN 1000, especially the first interconnection node 1011.

Figure 2:
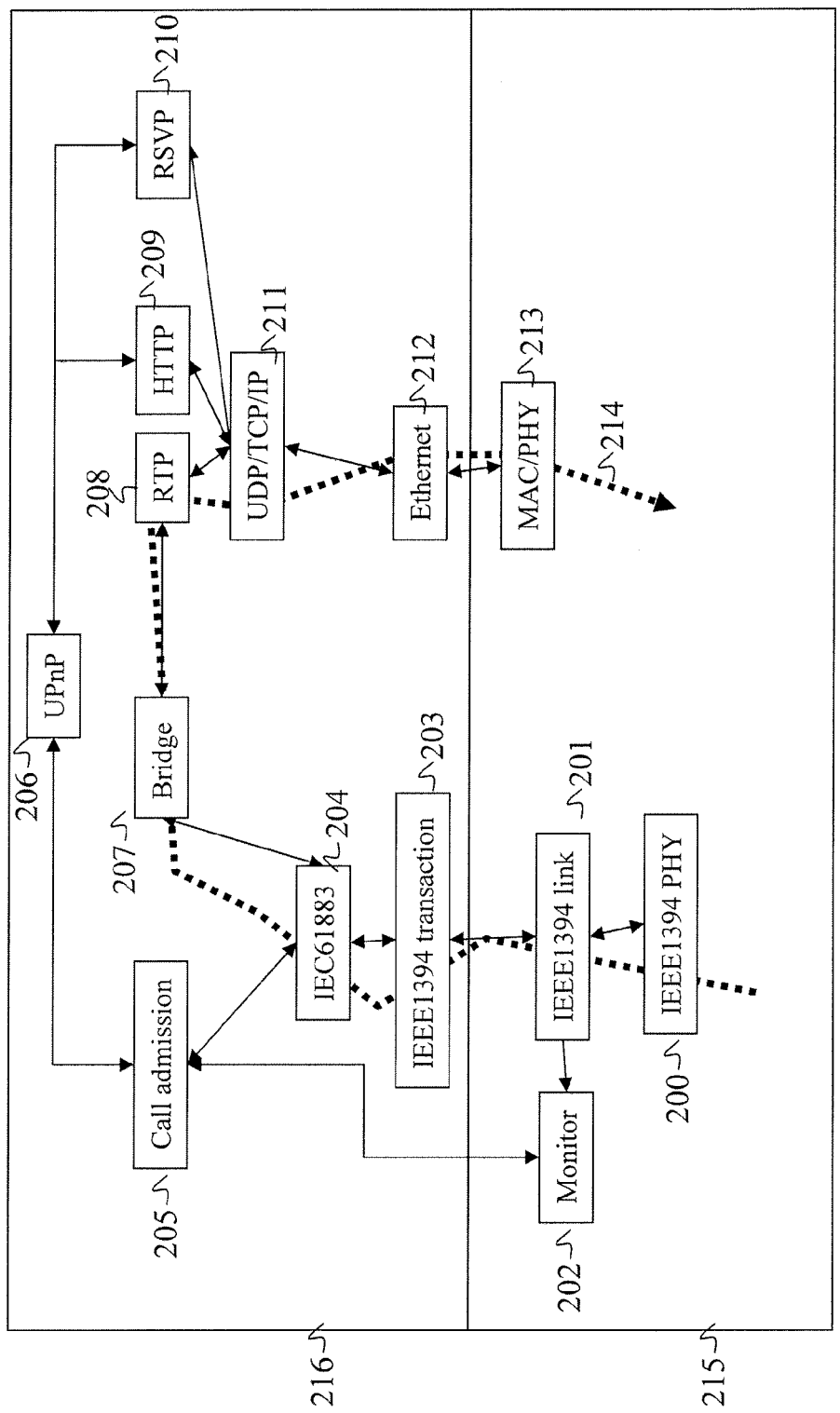
FIG. 2 illustrates an example of a protocol architecture implemented in the first interconnection node of the network of FIG. 1 at the reception of a content according to the above-mentioned particular embodiment.

Referring to FIG. 2, we present an example of a protocol architecture implemented in the first IEEE-1394/IP LAN interconnection node 1011 during the reception of c0 according to the above-mentioned particular embodiment. Naturally, should a content be transmitted through the second interconnection node 1012, this protocol architecture is also implemented in this second interconnection node 1012.

This architecture has a first domain 215, called a hardware domain, and a second domain 216, called a software domain.

A data plane 214, represented in dashes in FIG. 2, shows the different modules crossed by the content c0 in the first IEEE-1394/IP LAN interconnection node 1011.

Thus, data packets arrive from the first IEEE-1394 bus 1051 and are received by an IEEE-1394 PHY ("Physical Layer") module 200. Then, they are placed in a FIFO (first-in first-out) memory of an IEEE 1394 link layer 201. Then the IEEE 1394 packets are received in the software domain 216 by an IEEE 1394 transaction module (or IEEE 1394 transaction layer) 203. Only the asynchronous packets require special transactional processing according to the IEEE 1394 standard. The isochronous packets transporting the data streams in the context of the invention do not require any special processing by the IEEE-1394 transaction module 203, and these packets are then given to the IEC 61883 module 204. Then, the IEC 61883 module 204 selects the packets proper to the content c0 from among the received isochronous packets.

Then, the c0 transport packets are delivered by a bridge 207 to an RTP server 208.

The IEEE-1394 PHY module 200, IEEE 1394 link module 201 and IEEE 1394 transaction module 203 are described in the following documents: "IEEE Std. 1394-1995, Standard for High Performance Serial Bus" and "IEEE Std 1394a-2000, Standard for High Performance Serial Bus Supplement".

The IEC 61883 module 204 is compliant with the above-mentioned IEC 61883 standard.

The bridge 207 may be implemented as explained in the document IETF draft: RTP Payload Format For IEEE 1394/IEC 61883 Isochronous Streams" drafted by B. Fairman and available especially on the Internet site http:/www.potaroo.net/ietf/idref/draft-fairman-rtp-61883.

Then, the c0 transport packets are transmitted using a data path compliant with the classic RTP protocol. Thus, the transport packets are encapsulated in RTP packets by the RTP server 208, then transmitted to a TCP/UDP/IP stack 211, then transmitted to an Ethernet driver 212 and then to an Ethernet controller 213.

The control of the bridge includes an UPnP module 206, an HTTP module 209, an RSVP module 210, a call admission manager module 205 and an observation or monitor module 202.

The UPnP, HTTP and RSVP protocols are classic standards used to set up streams and call admission control.

The call admission manager module 205 receives call admission control commands from the UPnP module 206 and sets up stream connections on the IEEE-1394 bus by means of the IEC 61183 module 204 according to the IEC 61883 standard.

The call admission manager module 205 also uses the services of the monitor module 202 to carry out monitoring (observation) of the streams in order to adjust the bandwidth reservation made by the UPnP module 206 and the RSVP module 201 as provided in the present invention.

FIG. 3 presents an example of an implementation of the first IEEE-1394/IP LAN interconnection node 1011 according to the above-mentioned particular embodiment. In the context of the above-mentioned particular embodiment, the second interconnection node 1012 is implemented in the same way as the first interconnection node 1011.

The first interconnection node 1011 has three boards, one CPU board (or microprocessor board) 200, one IEEE-1394 board 301 and one PCI (protocol control information) Ethernet board 302. These boards are interconnected through a PCI (protocol control information) bus 303.

In the CPU board 300, a microprocessor 309 (for example an x86 compatible microprocessor such as a microprocessor commercially distributed under the reference Pentium by the firm Intel®) is connected to a memory 310 and a PCI bus bridge 311, for example the bridge commercially distributed under the reference "Intel 82801" by the firm Intel®. The PCI bus bridge 311 is connected to the PCI bus 303 via a PCI controller 308.

The software domain of the protocol architecture of FIG. 2 is implemented in the microprocessor 309.

The IEEE-1394 board 301 has an IEEE-1394 physical interface (or "PHY interface") 304 connected to an IEEE-1394 link module 305, itself connected to a traffic monitor module 306 and a PCI interface module 307.

The IEEE-1394 physical interface 304 is for example the interface commercially distributed under the reference "TSB41BA3A" by the firm Texas Instruments® and the IEEE-1394 link module 305 is for example the module commercially distributed under the reference TSB12LV26 by the firm Texas Instruments®.

The traffic monitor module 306 (described in detail here below) monitors the incoming IEEE-1394 streams in order to give the microprocessor 309 indications on the bandwidth.

Alternatively, an IEEE-1394/IP LAN interconnection node 1011 such as this may be implemented with a different number of electronic boards.

FIG. 4 presents the main steps of a monitoring algorithm implemented by the traffic monitor module 306 when a connection is opened for the transmission of a stream, for example c0, between the first IEEE-1394 bus 1051 and the first Ethernet segment 1041 of the IP/LAN 1000 according to the above-mentioned particular embodiment.

At each connection, in a phase known as a monitoring phase of a determined duration, the traffic monitor module 306 observes (monitors) the characteristics of the stream described in detail here below and transmits these characteristics to the call admission manager module 205.

Just as in a background task, the monitor module 306 informs the call admission manager module 205 when there is a change in characteristics of the streams whose connections have already been set up.

In a step 400, when a connection is set up for the transmission of c0, or at the start of a monitoring phase on a stream whose connection has already been set up, the traffic monitor module 306 is initialized for the connection (identified by an IEEE-1394 isochronous channel number). The monitoring phase starts at this instant for this channel.

In a step 401, the traffic monitor module 306 awaits the reception of an IEEE-1394 type isochronous packet belonging to the connections set up for the transmission of the stream c0. In a step 402, at reception of a current packet, the traffic monitor module 306 verifies the continuity of the stream c0. The discontinuity can be verified by means of DBC (data block count) information contained in the CIP headers of the packets according to the IEC 61883 standard, and shall be described more amply with reference to FIGS. 8A to 8D. Then, in a step 403, if discontinuity is detected in the stream c0 (for example due to a packet loss), then in the step 400, the monitoring phase is reinitialized since the monitoring algorithm of the invention is based on a continuous comparison of time-stamp information (as explained here below).

If no discontinuity is detected in the stream c0, then the maximum packet size observed during the monitoring phase is recorded in a step 404.

Then, in a step 405, a check is made to see whether a TS type packet header is present in the current isochronous packet. As defined in the IEC 61883 standard, the TS type packets may be segmented into several IEEE-1394 type isochronous packets or several TS type packets may be concatenated into a single IEEE-1394 type isochronous packet.

If no TS type packet header is present in the current isochronous packet, then the step 401 is again implemented in order to wait for the next isochronous packet belonging to the connections set up for the transmission of the stream c0.

If a TS type packet header is present in the current IEEE-1394 isochronous packet then, in a step 406, the current time stamp is obtained from a piece of time-stamp information included in each transport packet. For example, the time-stamp information of a TS type packet is contained in the header of said packet.

Then, in a step 407, the value of the real bit rate of this stream c0 (or real bandwidth necessary for this stream c0) is computed from the knowledge of the time interval between the time-stamp information of the current TS type packet and the time-stamp information of a preceding TS type packet. To this end, the time-stamp information recorded during the processing of the previous packet is used. Thus, this step is not implemented for the first time at the reception of the first isochronous packet belonging to the connection set up for the transmission of the stream c0.

In a step 408, the current time-stamp information is recorded in order to be used for the computation of the bit rate during the analysis of the next packet.

In a step 409, the value of the bit rate computed for the current packet is compared with the value of the previously computed bit rate (this step is not implemented for the first packet received). If the bit rate values are identical, a constant bit rate counter referenced CBR 508 (described here below with reference to FIG. 5) is increased in a step 410. If the bit rate values are different, the counter CBR is reduced in a step 411.

At the end of the monitoring phase, if the counter CBR shows a positive value, then the stream c0 is called a stream having "constant bit rate" behavior or "CBR" behavior; if the CBR counter has a negative value, then the stream c0 is called a stream having "variable bit rate" behavior or "VBR" behavior.

Then, in a step 412, a check is made to see if another TS type packet header is present in the current isochronous packet. If this is the case, the step 406 is performed again. If not, in a step 413, a check is made to see if the monitoring phase has ended.

If the monitoring phase has not ended, then the step 401 is performed again in order to wait for the next isochronous packet belonging to the connection set up for the transmission of the stream c0.

If the monitoring phase has ended, then in the step 414, the characteristics (especially in terms of bit rate) of the stream c0 are sent to the call admission manager module 205.

The above-mentioned characteristics of the stream c0 may include the CBR or VBR behavior of the stream and/or the bit rate of the stream and/or the maximum isochronous packet size observed if the stream is a stream with VBR behavior.

Then, the step 400 is performed again for a new monitoring phase.

Referring to FIG. 5, an example is presented of the implementation of the traffic monitor module 306 according to the above-mentioned particular embodiment.

The traffic monitor module 306 comprises:
- a reception memory 503 in which the IEEE-1394 type isochronous packets received are stored;
- a packet analyzer 504 which computes the bit rate of the stream c0 through the analysis of the isochronous packets received (as described with reference to FIG. 4);
- microprocessor interface registers 500 which communicate with the microprocessor 309;
- internal registers 505 used by the packet analyzer 504 in order to carry out the monitoring as described here above with reference to FIG. 4 and as described in greater detail here below, with reference to FIGS. 8A to 8D. The microprocessor interface registers 500 are distributed into two sets of 64 registers each;
- One set of 64 traffic registers 501 and one set of 64 parameter ("params") registers 502, one traffic register and one parameter register being associated with each isochronous mode transmission channel on the IEEE-1394 bus (there are 64 transmission channels in isochronous mode available on one IEEE-1394 bus) and therefore corresponding to a given stream. The traffic register reflects the type of stream (the type may for example be SD-DV, HD-DV, MPEG2 CBR or MPEG2 VBR). The param register 502 comprises the value of the bit rate if the stream has CBR behavior (for example SD-DV, HD-DV, MPEG2 CBR) and the maximum size of the isochronous packet observed during the monitoring phase if the traffic has VBR behavior (for example MPEG2 VBR);
- a register Start_monitoring(i) 514 indicating that the channel i has been validated or not validated for control by the call admission manager module 205.

The internal registers 505 are distributed among eight sets of 64 registers, each of the registers among the 64 registers corresponding to an isochronous channel. In particular, for the channel i, these registers are:
- a register TS(i) 506 which is a pointer to the header of the TS type packet;
- a register Period(i) 507 which records the duration of the monitoring phase;

a register CBR(i) 508 which is the above-mentioned CBR counter. This counter represents characteristics in terms of bit rate of the stream; if a stream with CBR behavior is observed during the monitoring phase, then the value of the CBR counter 508 is equal to the value of the register Period(i) 507;

a register Rate(i) 509 which includes the value of the bit rate;

a register Start_period(i) 510 which indicates the fact that a new monitoring phase is beginning;

a register DBC(i) (data block count) 511 which is a counter of already processed data blocks of the transported stream;

a register Reinit(i) 512 which indicates whether or not the channel statistics must be reinitialized;

a register Max(i) which stores the maximum isochronous packet content size observed during the monitoring phase.

The traffic monitor module 306 furthermore includes a set of intermediate computation registers (or variables):

a register Ch which identifies the transmission channel from which the isochronous packet being analyzed has come;

a register Payload_Length and a register DBC_temp which are used during the computation of the size of data processed or to be processed;

a register Payload_Type which indicates the type of data contained in the isochronous packet being analyzed (DV, MPEG2) and a register SD_HD used in the case of a DV type content to indicate the definition of the content (standard definition SD-DVCR or high-definition HD-DVCR);

a register Tick_nb and a register Cycle_nb which serve respectively to indicate a number of clock strokes or ticks of the IEEE-1394 bus and a number of cycles of the IEEE-1394 bus;

a register K which indicates a number of 192-byte data blocks;

a register R which indicates a computed bit rate;

a register TS_temp which is used for the temporary storage of the header of a TS type packet.

Referring to FIG. 6, we present the main steps of a call admission control algorithm implemented by the call admission manager module 205 in the context of the above-mentioned particular embodiment.

In a step 600, a call for a connection, coming for example from a module 206 according to the UPnP standard is received. Then, in a step 601 a reading is made, according to the IEEE 1394 and IEC 61883 standards, of the register oPCR (output plug control register as defined by the IEC 61883 standard) of the first source terminal 1031 and makes it possible to obtain the maximum bit rate that the first source terminal 1031 is capable of delivering.

Then, in a step 602, an attempt to reserve resources on the first IEEE-1394 bus 1051, as described in the IEEE-1394 standard, is implemented with the IRM (isochronous resource manager) equipment of the IEEE-1394 bus to obtain a given isochronous channel and an associated bandwidth.

In a step 613, if no source reservation is possible, then in a step 608 the call is rejected.

If the resource reservation is successful (it corresponds to the bit rate exported by the first source terminal according to the IEEE 1394 and IEC 61883 standards, namely the maximum bit rate that the first source terminal 1031 is capable of delivering), then in a step 610, the traffic monitoring module 306 is initialized for the IEEE-1394 channel obtained in the above-mentioned step 602. For the initialization, the value 1 is assigned to the register Start_monitoring 514 of the channel obtained, "no" to the variable backgroundMonitoring of the channel obtained and "no" to the variable alreadyAdjusted of the channel obtained. The variable backgroundMonitoring is used to indicate whether, for the channel obtained, a phase of observation of the traffic must be executed. The variable alreadyAdjusted is used to indicate whether, for the channel obtained, the bandwidth (or the resources) needed for the transmission of the stream on the IP LAN has already been adjusted.

Then, in a step 603, an attempt is made to reserve resources on the IP LAN 1000 in compliance with the RSVP protocol with a bandwidth value that is obtained in the step 601 and corresponds to the maximum bit rate that the first source terminal 1031 is capable of delivering.

In a step 614, a check is made to see whether the resource reservation has been successful.

If the resource reservation has been successful then, in a step 604, the call is accepted, the value corresponding to the maximum bit rate of the first source terminal 1031 is assigned to the variable local_Param and the value "unknown" is assigned to the variable local_Traffic of the channel obtained. Then the algorithm is ended.

The variables local_Param and local_Traffic serve to memories the characteristics of a stream in order to measure change at the detection of a change in the nature of a stream as described here below with reference to FIG. 7.

If the resource reservation has not been successful then, in a step 605, the call is accepted but the data path is not yet open. The data path is open only on the first IEEE-1394 bus 1051 side. This makes it possible to monitor the IEEE-1394 traffic. The IEEE-1394 packets are not retransmitted to the IP LAN 1000 but are swallowed.

Then, in a step 606, the characteristics of the stream c0 (especially in terms of bit rate) are awaited by the call admission manager module 205.

The characteristics of the stream c0 announced by means of an interrupt generated by the traffic monitor module 306 once this module has obtained them as described here above with reference to FIG. 4.

Then, in a step 611, when the characteristics of c0 are received, the characteristics of c0 are read in the registers Traffic and Param of the channel obtained. If the stream c0 is a stream with CBR behavior, then the register Param comprises the bit rate value read in the characteristics of the stream c0; if the stream c0 is a stream with VBR behavior, then the register Param comprises the maximum bit rate that the first source terminal 1031 is capable of delivering (oPCR).

Then in a step 612, the value of the bit rate read in the characteristics is compared with the value of the maximum bit rate that the first source terminal 1031 is capable of delivering (obtained in the step 601).

If these two values are equal, then it means that it is impossible to reserve resources on the IP LAN 1000 for the transmission of c0 since such a reservation has already failed in the step 603. Then, in a step 617, the resources reserved on the first IEEE-1394 bus 1051 are released and the IEEE-1394 connection is closed. Then, in a step 609, the resources allocated in the step 605 are released. Then the algorithm is ended.

If the value of the bit rate read in the characteristics is lower than the value of the maximum bit rate that the first source terminal 1031 is capable of delivering then, in a step 607, a resource reservation (for example compliant with the RSVP protocol) on the IP LAN 1000 is again attempted but with the bit rate value (or bandwidth) read, i.e. the value of the requested reservation is lower than the value previously requested at the step 603.

Then, in a step 615, a check is made to see whether the attempt at resource reservation has succeeded. If the attempt at resource reservation has failed, then the step 617 is implemented. If the attempt at resource reservation has succeeded, then in a step 616 the swallowing of the packets is stopped and a data path is opened between the first IEEE-1394 bus 1051 and the IP LAN 1000.

Then, the value "yes" is assigned to the variable backgroundMonitoring, the value "yes" to the variable alreadyAdjusted for the channel obtained, the value of the register Traffic is assigned to the variable local_Traffic and the value of the register Param to the variable local_Param for the channel obtained.

Referring to FIG. 7, we present the main steps of an algorithm for monitoring the evolution of the bandwidth requirements for the transmission of a given content or active stream coming from an IEEE-1394 bus in the context of the above-mentioned particular embodiment.

This algorithm is run as a background task. It is used to detect a change in bandwidth requirements for the transmission of the streams. If a change in bandwidth requirements is detected, then the algorithm performs an adjustment of resource reservation (for example compliant with the RSVP protocol) on the IP LAN 1000.

In a step 701, during an interrupt operation generated by the traffic monitoring module 306, for the given content, for example the stream c0 in transmission on a given channel, the algorithm obtained has the characteristics of the given contents stored in the registers Param and Traffic associated with the given channel.

Then, in the step 713, a check is made to see whether it is necessary to carry out background monitoring for the given stream (i.e. whether a register backgroundMonitoring for the given channel presents the value "yes"). The first monitoring may be performed during the call admission phase for the given content if the reservation of the bandwidth corresponding to the maximum bit rate fails at the level of the IP LAN 1000.

If background monitoring is not necessary for the given content, then the algorithm is ended in a step 716.

If background monitoring is necessary for the given content then, in a step 702, a check is made to see whether the bandwidth has already been adjusted for the given content (i.e. whether a register alreadyAdjusted for the given channel has the value "yes"). The first reservation is based on the maximum bit rate that can be given by the first source terminal 1031 and the first adjustment is based on the properties of the given content (for example the type of stream: DV, MPEG2 CBR, MPEG2 VBR, etc.).

Thus, when a first adjustment has taken place, only the changes in bit rate for the given content are important.

If the bit rate has already been adjusted for this given content then a step 708 is implemented. If not, a step 703 is implemented.

In the step 703, a check is made to see whether the given content is a DV type content (i.e. if the register Traffic for the given channel has the value "DV"). If the given content is a DV type content then, in a step 704, an adjustment is made in the resource reservation on the IP LAN 1000 for the given content at the level of the bit rate DV. For example 30 Mbit/s are reserved for an SD-DV type given content and 60 Mbit/s for an HD-DV type given content, the value of the register Param is assigned to the variable local_Param for the given channel and the value of the register Traffic is assigned to the variable local_Traffic for the given channel.

If the given content is not a DV type content but an MPEG2 TS ("Transport Stream") type stream, then in a step 706 a check is made to see whether the content has CBR behavior (i.e. whether the register Traffic for the given channel has the value "CBR"). If the given content does not have CBR behavior then, in a step 705, the resource reservation for the given content on the IP LAN 1000 is adjusted to the peak value of the bit rate which is stored in the register Param of the given channel and the value of the register Param is assigned to the variable local_Param for the given channel and the value of the register Traffic is assigned to the variable local_Traffic for the given channel.

If the given content has CBR behavior then, in a step 707, the resource reservation for the given channel on the IP LAN 1000 is adjusted to the computed value of the bit rate which is stored in the register Param of the given channel and the value of the register Param is assigned to the variable local_Param for the given channel and the value of the register Traffic is assigned to the variable local_Traffic for the given channel.

In the step 708 (the fact that the step 708 is implemented means that the nature of the given content has changed), the values of the registers Traffic and Param for the given channel are compared with the values of the variables, local_Traffic and local_Param respectively, for the given channel in order to determine whether the required bit rate has increased or diminished.

If the required bit rate has diminished then, in a step 709, the resource reservation in the IP LAN for the given content is reduced to the required value and the value of the register Param is assigned to the variable local_Param for the given channel and the value of the register Traffic is assigned to the variable local_Traffic for the given channel. Then the algorithm is ended.

If the required bit rate has increased then, in a step 710, an attempt is made to increase the resource reservation in the IP LAN for the given content. Then, in a step 711, a check is made to see whether the increase in the resource reservation in the IP LAN for the given content has been successful or not.

If the increase has been successful then, in a step 714, the value of the register Param is assigned to the variable local_Param for the given channel and the value of the register Traffic is assigned to the variable local_Traffic for the given channel. Then the algorithm is ended.

If the increase has failed then, in a step 712, the connections on the IEEE-1394 side and on the IP LAN side are released for there are not enough resources to transmit the given content. The connection that had been set up for the transmission of the stream is then stopped, the network being incapable of continuing this transmission. Then, the algorithm is ended.

Referring to FIGS. 8A to 8D, a description is provided of the main steps of a monitoring algorithm, compliant with the above-mentioned embodiment, for the monitoring on a given channel of the given content, for example the content c0, when the identified format of c0 (FIG. 8A) is MPEG2 TS (FIGS. 8B and 8C) or DV (FIG. 8D).

This algorithm is implemented by the packet analyzer 504 of the traffic monitor module 306.

If the register Start_monitoring associated with the given channel has the value 1 then, in a step 801, the algorithm is initialized.

Then, in a step 802, the algorithm awaits the reception of a new IEEE-1394 isochronous packet. If no new isochronous packet is received, then the step 802 is performed again.

At the reception of a new IEEE-1394 isochronous packet, in a step 803 the field TAG (as defined in the IEEE-1394 standard) of the header of the IEEE-1394 isochronous packet is read.

If the TAG field has the value 01 (which means that the isochronous packet includes a CIP header as defined in the IEC 61883 standard), then a step 804 is implemented. If not, the step 801 is again performed.

In the step 804, the field FMT (as defined in the IEC 61883 standard) of the CIP header is read.

If the field FMT has the binary value 100000 (indicating that the content c0 is an MPEG2 type content) then the step 806 is performed for a processing operation specific to the MPEG2 contents. Else, in a step 805, if the field FMT has the binary value 000000 (indicating that the content c0 is a DV type content) then the step 807 is performed for a processing specific to the DV contents. If not, the step 801 is performed again.

In the step 806, the DBC register 511 as well as the registers Ch, Payload_Type (type of content of the isochronous packet) and Payload_Length (length of the content of the isochronous packet) are filled. The register DBC_temp is filled with the bits 7 to 0 of the CIP header CIP (CIP [7 . . . 0]), these bits representing, according to the IEC 61883 standard, a data block count. The register Ch is filled with the bits 13 to 8 of the Iso Header (Iso Header [13 . . . 8]) of the isochronous packet, these bits representing, according to the IEEE-1394 standard, the isochronous channels used for the transmission of the packet. The value MPEG2 is assigned to the register Payload_Type. The register Payload_Length is filled with the bits 31 to 6 of the Iso Header (Iso Header [31 . . . 16]) of the isochronous packet, these bits representing, according to the IEEE-1394 standard, the size of the isochronous packet without taking account of the size of the header itself or of the reserved fields "Header_CRC" and "Data_CRC" used to check the integrity of the data.

Then, in a step 808, a check is made to see whether the register Reinit has the value 1 for the given channel. If this is the case then, in a step 809, the registers associated with the given channel are initialized, the following values being assigned:
TS="empty";
Period=0;
Max=8, corresponding to the size of an isochronous packet that contains only one CIP header without associated data block;
CBR=0 (the higher the value of the CBR register, the greater the probability of a stream with constant bit rate);
Traffic="empty";
Rate=0;
Reinit=0;
Start_Period=1;
DBC="empty".
Then the step 808 is implemented again.

If the register Reinit does not have the value 1 for the given channel then, in a step 810, a check is made to see whether the register Start_Period has the value 1 for the given channel.

If the register Start_period has the value 1 for the given channel then, in a step 811, the registers associated with the given channel are initialized, the following values being assigned:
TS=0;
Rate=0;
Period=0;
Max=8, corresponding to the size of an isochronous packet that contains only one CIP header without associated data block;
CBR=0 (the higher the value of the CBR register, the greater the probability of a stream with constant bit rate);
Start_period=0;
DBC=DBC_temp (bits 0 to 7 of the CIP header).
Then the step 801 is implemented again.

If the register Start_period does not have the value 1 for the given channel (but rather the value 0) then in a step 812 a check is made to see if the following equality is true:

Payload_Length−8=(DBC_temp−DBC)*24 for the given channel where DBC is the register storing the result of the data block count from the start to the current packet (for the given channel Ch), "8" is the size in bytes of the CIP header (the information on data length in the header of the isochronous packet takes account of the CIP header) and the coefficient "24" corresponds to the number of bytes per data block according to the IEC 61883 standard.

Should the quality not be verified it means that there is discontinuity in the reception of the packets, i.e. that at least one packet has been lost and, in this case, in a step 814, the value 1 is assigned to the register Reinit associated with the given channel in order to reinitialize the statistics (owing to the detection of the loss of at least one packet). Then, the step 801 is performed again.

Should be equality be verified, it means that no packet has been lost and, in this case, in a step 813, the size of the content of the current isochronous packet (Payload_Length register) is compared with the maximum previously recorded size (Max register for the given channel).

If the size of the content of the current isochronous packet is greater than the maximum previously recorded size, then a step 816 is performed.

If the size of the content of the current isochronous packet is greater than the maximum previously recorded size then, in a step 815, the length of the current isochronous packet is recorded in the register Max associated with the given channel and then the step 816 is performed.

In the step 816, the value of the DBC_temp register is assigned to the DBC register.

Then, in a step 817, a check is made to see whether the three least significant bits (LSB) of the register DBC_temp are equal to 000. If this is the case it means that the operation is not at the beginning of a TS type packet and then the step 801 is again implemented.

If the three least significant bits of the register DBC_temp (equivalent at this level of the algorithm with the content of the DBC register for the given channel) are equal to 000, it means that the operation is at the start of a TS type packet and then, in a step 818, the number of TS type packets included in the isochronous packet is recorded in a register K (the value stored in the register K is given by the expression: K=Int (Payload_Length−8)/192, "8" being the size in bytes of the CIP header and "192" the size in bytes of a packet in the MPEG2 TS format). Indeed, a same isochronous packet may contain several TS type packets (the number of which is identified by the variable K), and the algorithm seeks to apply a processing operation to each of these TS type packets.

Then, in a step 819, the next header of the TS type packet (the first one in the event of a first passage to the step 819) is assigned to the register TS_temp and the value of the register Period associated with the given channel is increased.

Then, in a step 820, a check is made to see whether no value has been assigned to the register TS associated with the given channel. The TS register 506 records the last header of the TS type packet for a given channel. It is used to monitor a progression when compared with the current header value of the TS type packet contained in the register TS_temp.

If no value has been assigned to the TS register associated with the given channel then, in a step 828, the value of the register TS_temp is assigned to the TS register associated with the given channel and then a step 829 is performed.

If a value has been assigned to the TS register associated with the given channel, then in a step 821, the following are assigned:

the difference between the bits 24 to 13 of the register TS_temp (TS (24 . . . 13)) and the bits 24 to 13 of the register TS 506 (TS(24 . . . 13)) associated with the given channel is assigned to the register Cycle_nb which represents the number of IEEE-1394 bus cycles produced since the first TS type packet (which may be contained in the same IEEE-1394 type isochronous packet);

the difference between the bits 11 to 0 of the register TS_temp (TS (11 . . . 0) and the bits 11 to 0 of the register TS 506 (TS(11 . . . 0)) associated with the given channel is assigned to a register Tick_nb which represents the number of IEEE-1394 clock strokes or ticks produced since the last TS type packet (which may be contained in the same IEEE-1394 type isochronous packet);

The combination of cycles and ticks that are produced gives the time elapsed since the previous TS type packet analyzed up to the current TS type packet.

Then, in a step 822, the real bit rate R of the data stream generating application is computed as being 188 bytes divided by the above-mentioned elapsed time, 188 bytes corresponding to the size of the content of a TS type packet according to the IEC 6183 standard.

Then, in a step 823, a check is made to see whether a value has been assigned to the Rate register 509 associated with the given channel.

If a value has not yet been assigned to the Rate register 509 associated with the given channel then, in a step 824, the value R is assigned to the Rate register 509 associated with the given channel and then a step 829 is performed.

If a value has been assigned to the Rate register 509 associated with the given channel, then in a step 825, the values of R and of the Rate register 509 associated with the given channel are compared. If these values are equal then, in a step 827, the CBR counter 508 associated with the given channel is incremented. If these values are different then, in a step 826, the CBR counter 508 associated with the given channel is decremented. Then, after each of the steps 826 and 827, in a step 829, the register K is decremented.

Then, in a step 830, the value of K is compared with 0. If K is strictly greater than 0 (which means that there are yet other 192-byte blocks (i.e. other TS type packets) in the isochronous packet to be processed) then the step 819 is performed again.

If the value of K is 0, then, in a step 831, a check is made to see whether the end of the monitoring phase has been reached for this given content c0 (i.e. a check is made to see whether the register Period associated with the given channel corresponds to a predetermined value "Th" which defines the duration of the monitoring period). If this is not the case, then the step 801 is performed again. If the monitoring phase has come to an end, then the characteristics of the content c0 need to be sent to the microprocessor 309.

Thus, in a step 834, a check is made to see whether a value has been assigned to the register Traffic 501 associated with the given channel.

If no value has been assigned to the register Traffic 501 (i.e. if it has the value "empty") associated with the given channel, then a step 836 is implemented.

If a value has been assigned to the register Traffic 501 associated with the given channel then, in a step 835, a check is made to see whether, during the monitoring phase, a content with CBR behavior has been observed (i.e. a check is made to see whether the CBR counter presents the predetermined value "Th"). If this is so, a step 839 is performed. If not, a step 841 is performed.

In the step 836, a check is made to see whether, during the monitoring phase, a content with CBR behavior has been recorded. If this is the case, a step 837 is performed. If not, a step 838 is performed.

In the step 837, a check is made to see whether the bit rate previously recorded in the register Param 502 is equal to the value of the current bit rate recorded in the register Rate 509 associated with the given channel.

If the bit rate previously recorded in the register Param 502 is equal to the value of the current bit rate recorded in the register Rate 509, implying that no new piece of information should be communicated to the microprocessor 309, then a step 840 is performed.

If the bit rate previously recorded in the register Param 502 is different from the value of the current bit rate recorded in the register Rate 509, implying that new information must be communicated to the microprocessor 309, then a step 840 is performed.

In the step 838, a check is made to see whether the current bit rate recorded in the register Param 502 is equal to the value of the maximum bit rate recorded in the register Max 509 associated with the given channel.

If the current maximum bit rate recorded in the register Param 502 is different from the value of the maximum bit rate previously recorded in the register Max 509 associated with the given channel, implying that new information must be communicated to the microprocessor 309, then the step 841 is performed.

If the current maximum bit rate recorded in the register Param 502 is different from the value of the maximum bit rate previously recorded in the register Max 509 associated with the given channel, implying that new information must be communicated to the microprocessor 309, then the step 841 is implemented.

In the step 839, the value CBR is assigned to the register Traffic 501 associated with the given channel; the bit rate is recorded in the register 502 associated with the given channel and then the step 840 is performed.

In the step 841, the value VBR is assigned to the register Traffic 501 associated with the given channel, the maximum bit rate is recorded in the register Param 502 associated with the given channel and then the step 840 is performed.

In the step 840, the value 1 is assigned to the register Start_period 510 associated with the given channel and then the step 801 is performed again.

For the processing performed in the case of a DV type content c0, it is not necessary to monitor the content c0. A DV type content is a content with CBR behavior.

In the step 807, the registers Ch, Payload_Type (isochronous packet type content) and SD_HD (carrying the information according to which the stream is of an SD-DVCR or HD-DVCR type, should the register Payload_Type identify a DV type content) are filled. The register SD_HD is filled with the bits 23 to 19 of the CIP header (CIP header [23 . . . 19]), the register Ch is filled with the bits 13 to 8 of the Iso Header (Iso Header [13 . . . 8]) of the isochronous header and the value DV is assigned to the register Payload_Type.

Then, in a step 842, a check is made to see whether the register Reinit has the value 1 for the given channel. If this is the case, then in a step 843, the registers associated with the given channel are initialized, in assigning the following values:

TS="empty";
Rate=0;
Reinit=0;
then the step 842 is performed again.

If the register Reinit does not have the value 1 for the given channel then, in a step 844, the value of the register SD_HD is verified in order to find out whether the given content c0 is of the SD-DVCR type or of the HD-DVCR type.

If the binary value of the register is 01111, implying that the content c0 is of a SD-DVCR type then a step 847 is performed.

In the step 847, it is verified that the value of the register Traffic 501 associated with the given channel is SD-DVCR to find out if the content c0 was already an SD-DVCR type content. If c0 was already an SD-DVCR type content, implying that the microprocessor 309 was already aware of this fact, then no action must be taken and the step 801 is performed again.

If the value of the register Traffic 501 associated with the given channel is not SD-DVCR, implying that the characteristics of the content c0 have just changed on the given channel (for example during a change of content selection sent out by an IEEE-1394 type audio-video hard disk drive) and that the microprocessor 309 needs to be informed, then a step 846 is performed.

In the step 846, the value SD-DVCR is assigned to the register Traffic 501 associated with the given channel, the value 30 Mbit/s is assigned to the register Param 502 associated with the given channel and an interrupt is generated in the microprocessor 309.

In the step 844, if the binary value of the register is not 01111, implying that the content c0 is of an HD-DVCR type, then a step 848 is performed.

In the step 848, it is verified that the value of the register Traffic 501 associated with the given channel is HD-DVCR in order to know whether the content c0 was already an HD-DVCR type content. If c0 was already an HD-DVCR type content, implying that the microprocessor 309 was already aware of this fact, then no action must be taken and the step 801 is performed again.

If the value of the register Traffic 501 associated with the given channel is not HD-DVCR, implying that the characteristics of the content c0 have just changed on the given channel and that the microprocessor 309 needs to be informed, then a step 849 is performed.

In the step 849, the value HD-DVCR is assigned to the register Traffic 501 associated with the given channel, the value 60 Mbit/s is assigned to the register Param 502 associated with the given channel and an interrupt is generated in the microprocessor 309.

The invention claimed is:

1. A method of allocating transmission resources for transmitting, in a communications network, a data stream from an intermediate device to a destination device, the data stream including a plurality of application data packets, the application data packets including application time-stamp information indicating a frequency of generating the application data packets, and the application data packets being transmitted from a source device to the intermediate device encapsulated in a plurality of transport data packets according to a communications protocol, wherein the intermediate device performs steps of:

receiving the transport data packets according to the communications protocol;

obtaining the application time-stamp information from the application data packets included in the transport data packets received;

determining an application bit rate from the application time-stamp information obtained and information indicating a quantity of data of the data stream received by the intermediate device;

determining whether the data stream is a constant bit rate data stream or a variable rate data stream, based on determined application bit rate information;

determining a value of bandwidth, based on the determined application bit rate and on whether the data stream is determined to be a constant bit rate data stream or variable rate data stream; and allocating the determined value of bandwidth for transmitting the data stream from the intermediate device to the destination device.

2. The method of allocating transmission resources according to claim 1, wherein each of the application data packets of the data stream includes a header that includes application time-stamp information, wherein the step of determining the application bit rate includes determining at least one instantaneous application bit rate value of the data stream from a time difference between application time-stamp information of an application data packet preceding a current application data packet and application time-stamp information of the current application data packet in the data stream.

3. The method of allocating transmission resources according to claim 2, wherein the step of determining the application bit rate includes comparing at least two instantaneous application bit rate values of the data stream.

4. The method of allocating transmission resources according to claim 2, wherein, if the data stream is determined to be a constant bit rate stream, the value of bandwidth is based on the at least one instantaneous application bit rate value.

5. The method of allocating transmission resources according to claim 1, wherein, if the data stream is determined to be a variable bit rate stream, the intermediate device determines a largest-sized application data packet in the data stream, and wherein the value of bandwidth is equal to a determined value, the determined value enabling transmission of application data packets having a size of the largest-sized application data packet in the data stream.

6. The method of allocating transmission resources according to claim 1, further comprising a step of verifying a continuity of the data stream.

7. The method of allocating transmission resources according to claim 1, wherein the method is performed periodically.

8. The method of allocating transmission resources according to claim 1, further comprising steps of:

receiving a request for allocating transmission resources for the data stream, the request including information indicating a maximum quantity of resources necessary;

attempting to allocate a bandwidth value for transmitting the data stream from the intermediate device to the destination device, the bandwidth value being based on the information indicating the maximum quantity of resources necessary; and if an allocation attempt fails, setting up a stream connection according to the communications protocol for transmitting the data stream from the source device to the intermediate device, the intermediate device erasing the received transport data packets after the application time-stamp information has been obtained.

9. The method of allocating transmission resources according to claim 1, wherein, prior to the obtaining of the application time-stamp information, a format of the data stream is determined.

10. A computer-readable storage medium storing computer-executable instructions that, when executed by a computer, cause the computer to perform a method, in a communications network, in which a data stream is transmitted from an intermediate device to a destination device, the data stream including a plurality of application data packets, the application data packets including application time-stamp information indicating a frequency of generating the application data packets, and the application data packets being transmitted from a source device to the intermediate device encapsulated in a plurality of transport data packets according to a communications protocol, wherein the method comprises:
receiving the transport data packets according to the communications protocol;
obtaining the application time-stamp information from the application data packets included in the transport data packets received;
determining an application bit rate from the application time-stamp information obtained and information indicating a quantity of data of the data stream received by the intermediate device;
determining whether the data stream is a constant bit rate data stream or a variable rate data stream, based on determined application bit rate information;
determining a value of bandwidth, based on the determined application bit rate and whether the data stream is determined to be a constant bit rate data stream or variable rate data stream; and
allocating the determined value of bandwidth for transmitting the data stream from the intermediate device to the destination device.

11. An intermediate device including means for allocating transmission resources for transmitting a data stream including a plurality of applications data packets in a communications network from the intermediate device to a destination device, the application data packets including application time-stamp information indicating a frequency of generating the application data packets, the intermediate device including means for receiving the data stream in a plurality of transport data packets according to a communications protocol, the transport data packets including the application data packets, the data stream coming from a source device, wherein the means for allocating transmission resources comprises:
means for receiving the transport data packets according to the communications protocol;
means for obtaining the application time-stamp information from the application data packets included in the transport data packets received;
means for determining an application bit rate from the application time-stamp information obtained and information indicating a quantity of data of the data stream received by the intermediate device;
means for determining whether the data stream is a constant bit rate data stream or a variable rate data stream, based on determined application bit rate information;
means for determining a value of bandwidth, based on the determined application bit rate and whether the data stream is determined to be a constant bit rate data stream or variable rate data stream; and
means for allocating the determined value of bandwidth for transmitting the data stream from the intermediate device to the destination device.

12. The intermediate device according to claim 11, wherein each of the application data packets of the data stream includes a header that includes application time-stamp information, and wherein the means for determining the application bit rate includes means for determining at least one instantaneous application bit rate value of the data stream from a time difference between application time-stamp information of an application data packet preceding a current application data packet and application time-stamp information of the current application data packet in the data stream.

13. The intermediate device according to claim 12, wherein the means for determining the application bit rate includes means for comparing at least two instantaneous application bit rate values of the data stream.

14. The intermediate device according to claim 12, wherein, if the data stream is determined to be a constant bit rate stream, the means for determining the value of the bandwidth takes account of the at least one instantaneous application bit rate value of the data stream.

15. The intermediate device according to claim 12, wherein the means for allocating transmission resources includes means for detecting whether the data stream is determined to be a variable bit rate stream, and means for determining a largest-sized application data packet in the data stream activated if the data stream is detected to be a variable bit rate stream, and
wherein the means for determining the value of bandwidth takes account of a determined value, the determined value enabling transmission of a data stream including application data packets having a size of the largest-sized application packet of the data stream.

16. The intermediate device according to claim 11, wherein the means for allocating transmission resources further includes means for verifying a continuity of the data stream.

17. The intermediate device according to claim 11, wherein the means for allocating transmission resources is activated periodically.

18. The intermediate device according to claim 11, wherein the means for allocating transmission resources includes:
means for receiving a request for allocating transmission resources for the data stream, the request including information indicating a maximum quantity of resources necessary;
means for attempting to allocate a bandwidth value for transmitting the data stream from the intermediate device to the destination device, the bandwidth value being based on the information indicating the maximum quantity of resources necessary;
means for setting up a stream connection according to the communications protocol for transmitting the data stream from the source device to the intermediate device,
wherein the intermediate device further comprises means for erasing the received transport data packets, the means for erasing being activated by the obtaining of the application time-stamp information, and
wherein the means for setting up a stream connection according to the communications protocol is activated if an allocation attempt fails.

19. The intermediate device according to claim 11, wherein the means for allocating transmission resources includes means for determining a format of the data stream.

* * * * *